United States Patent
Doran et al.

[11] Patent Number: 6,157,844
[45] Date of Patent: Dec. 5, 2000

[54] METHOD AND APPARATUS FOR SELECTING A COMMUNICATION MODE IN A MOBILE COMMUNICATION DEVICE HAVING VOICE RECOGNITION CAPABILITY

[75] Inventors: Patrick J. Doran, Pembroke Pines; Douglas E. Ross, Plantation; Sheetal Shah, Coral Springs, all of Fla.

[73] Assignee: Motorola, Inc., Schaumburg, Ill.

[21] Appl. No.: 09/366,100

[22] Filed: Aug. 2, 1999

[51] Int. Cl.⁷ ...................................................... H04B 1/38
[52] U.S. Cl. .......................... 455/552; 455/426; 455/518; 455/563
[58] Field of Search ..................................... 455/422, 426, 455/518, 525, 550, 552, 553, 556, 557, 563, 564, 569, 575; 704/200, 221, 246, 251, 252, 275; 370/342, 345

[56] References Cited

U.S. PATENT DOCUMENTS

| | | | |
|---|---|---|---|
| 5,754,542 | 5/1998 | Ault et al. | 370/342 |
| 5,826,199 | 10/1998 | Maeda | 455/563 |
| 5,842,123 | 11/1998 | Hamamoto et al. | 455/563 |
| 5,943,333 | 8/1999 | Whinnett et al. | 370/345 |
| 6,006,106 | 12/1999 | Cook et al. | 455/552 |
| 6,011,978 | 1/2000 | Ault et al. | 455/552 |
| 6,085,110 | 7/2000 | Nillson | 455/552 |

*Primary Examiner*—Nay Maung
*Attorney, Agent, or Firm*—Scott M. Garrett

[57] ABSTRACT

A mobile communication device containing voice recognition capability is first enabled to perform voice recognition (102). The user then speaks the name of the party the user wishes to call (104), the name corresponding to a record the user has programmed into a memory of the mobile communication device. The mobile communication device then uses the output (106) of the voice recognition process to search the memory for a corresponding record (108). The record contains at least two calling numbers, each associated with a different mode of communication, such as dispatch and telephone communication. For a brief period of time after locating the record, the mobile communication device waits (118) for the user to initiate a call in the first communication mode (120) by, for example, pressing a dispatch call button (124). If, after a preselected duration of time has passed and no input is received from the user, the mobile communication device defaults to a second communication mode and makes a call (122).

9 Claims, 2 Drawing Sheets

METHOD AND APPARATUS FOR SELECTING A COMMUNICATION MODE IN A MOBILE COMMUNICATION DEVICE HAVING VOICE RECOGNITION CAPABILITY

TECHNICAL FIELD

This invention relates in general to mobile communication devices, and more particularly to mobile communication device that are capable of engaging in more than one type of communication service.

BACKGROUND OF THE INVENTION

Mobile communications has evolved from an expensive service, used by relatively few people, to a commonly used and affordable service. Many people consider their mobile communications service as indispensable as land line telephone service. With the proliferation of mobile communication systems, there has been a demand for additional services besides mobile telephone service. Recently some service providers and system operators have begun to offer dispatch service in addition to telephone service, both types of service being supported by a single mobile communications device. Dispatch service is essentially a half duplex communication mode where users take turns speaking, similar to two way radio communication except the signal is carried over a land based network instead of directly from radio to radio. Just as each mobile communication device has an associated telephone number, so does it have an associated dispatch identification number.

It is also true that manufactures are designing more features into mobile communication devices. One feature that is gaining popularity is voice recognition for selecting a record from a memory of the mobile communication device. Typically a user stores the name and phone number of another party, or may have the number stored in one of a few speed call memory locations. When the user desires to call another party for which there is a record stored in the mobile communication device, the use activates voice recognition and speaks the party's name. The voice recognition algorithms maps the audio voice signal to, for example, a record identifier such as text, and uses this to locate a corresponding record in the memory. When the record is located, the associated phone number is retrieved and either the number is automatically dialed, or displayed so that the user can simply confirm it is the desired record.

Voice recognition is a relatively processor intensive operation. For a hand held, battery operated communication device, it is preferable to minimize the amount of processing done in completing tasks. There are numerous methods and algorithms for performing voice recognition, many of which, while powerful and typically are highly accurate, would require far more computing resources than is typically available in a cost sensitive product such as a mobile communication device. Therefore, the voice recognition techniques used are generally less accurate than higher accuracy versions used in, for example, desktop personal computers. Therefore, it is preferable if, in a mobile communication device, the voice recognition based record retrieval can be performed with the utterance of a single word. In communication devices that support only one mode of communication, i.e. telephone interconnect, only the name or speed dial number of the desired record needs to be uttered by the user. This limits the amount of processing that is necessary, and therefore allows the use of a less powerful voice recognition method.

However, in a mobile communication devices that support more than one type of communications modes, such as mobile telephony and dispatch calling, each record will typically have two numbers associated with it; one for a first mode of communication, such as dispatch or private dispatch calling, and a second number associated with a second mode of communication, such as mobile telephony. In employing voice recognition, the voice recognition would have to be given an indicator as to which communication mode is desired so that the appropriate number can be retrieved. This can be done by speaking the type of service in addition to the name of the party the user wishes to call. However, a two-word utterance is less likely to be accurately recognized; if a single word has a 90% probability of being recognized, two words together have only an 81% likelihood of being properly recognized (90% for each word). Therefore there is a need for performing voice recognition based record retrieval in a mobile communication device having more than one more of communication, without increasing the amount of voice information that needs to be processed.

DETAILED DESCRIPTION OF A PREFERRED EMBODIMENT

Figure 1:
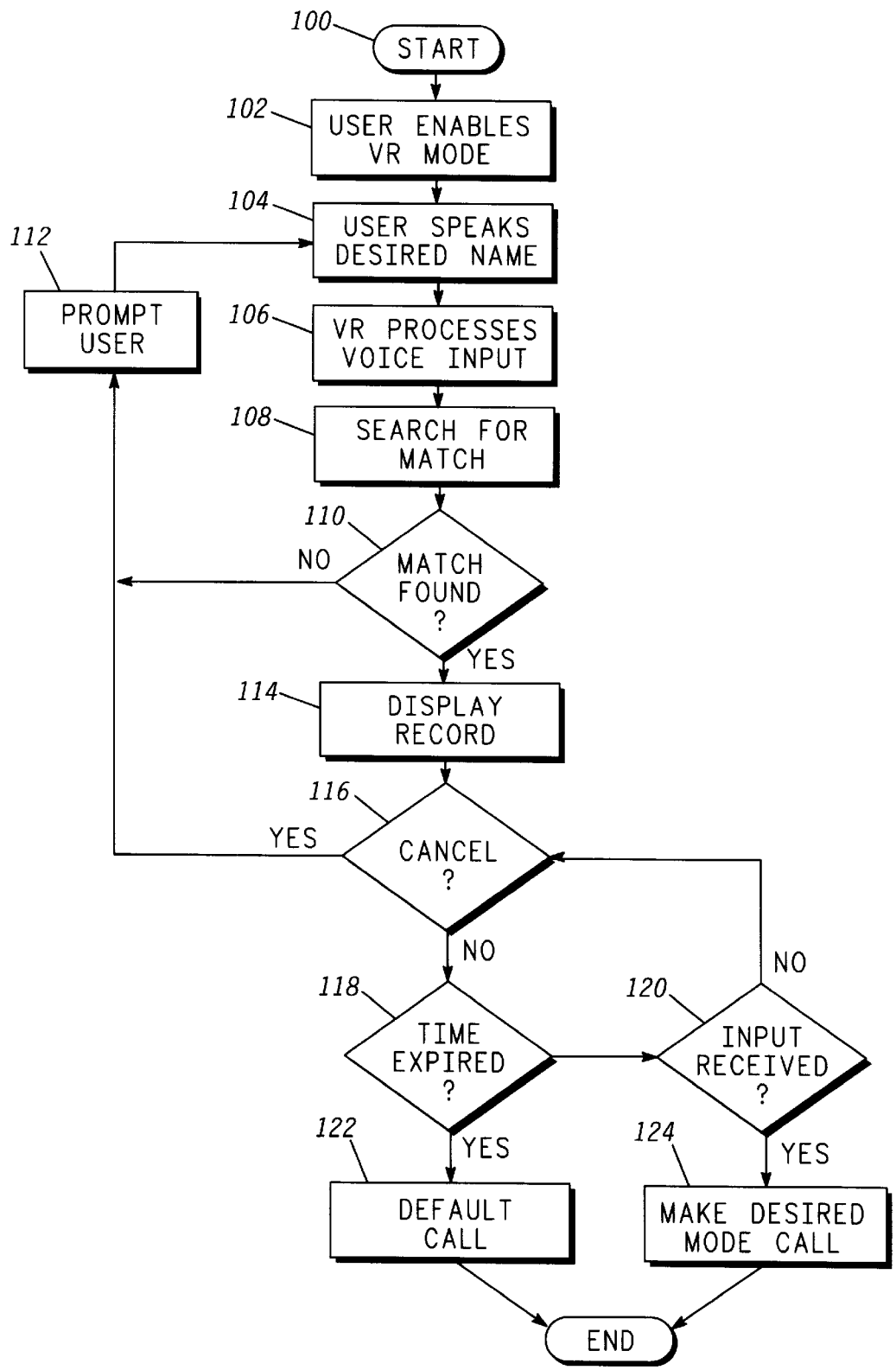
FIG. 1 shows a flow chart diagram of a method for selecting a communication mode in a mobile communication device having voice recognition capability.

While the specification concludes with claims defining the features of the invention that are regarded as novel, it is believed that the invention will be better understood from a consideration of the following description in conjunction with the drawing figures, in which like reference numerals are carried forward.

The invention permits a default communication mode to be set. Upon enabling a voice recognition mode in the mobile communication device, the user speaks a single word corresponding to the desired record, such as the name of the party to be called. The mobile communication device will then correlate the received audio voice information with a record and initialize the mobile communication device to make a call associated with a first calling number, such as a dispatch call, whereupon the user will, for example, press a dispatch call button to make the dispatch call. However, if no input is received within a preselected period of time, the mobile communication device defaults to a second mode of communication, and uses a second calling number associated with the record to make a corresponding type of call, such as a telephone call. Preferably, the second type of call is made automatically, without user input after the time has expired.

Referring now to FIG. 1, there is shown a flow chart diagram of a method for selecting a communication mode in a mobile communication device having voice recognition capability. At the start (100) the mobile communication device is powered-up, and registered for service with a communication service provider. The start up step includes the step of providing a communication device that is capable of making calls in at least two communication modes, such as dispatch or telephone. By dispatch it is meant a half-duplex type of communication, similar in effect to two-way radio communication. An example of such a mobile communication device would be any one of the mobile communication devices sold by Motorola, Inc. under the trade name iDEN. Upon the user of the mobile communication device deciding to make a call, the user enables (102) a voice recognition mode of the mobile communication device. Since performing voice recognition requires processor operations, it is best to leave it off when not in use to conserve battery energy. Upon enabling voice recognition, the mobile communication device will preferably provide an indication that voice recognition is enabled, queuing the user to begin speaking (104). The mobile communication device receives (106) the audio voice input, and begins processing it in accordance with known voice recognition techniques. Generally, the voice recognition process will map the audio voice input to a means of identifying a record that is easily manipulated by a digital processor, such as ASCII text. The mobile communication device then correlates the output with a record stored in a memory of the mobile communication device by searching (108) through the records stored therein for a match. If no match is found (110), the mobile communication device will prompt (112) the user to try again. If a match is found, the record is retrieved, and an indication is given to the user by, for example, displaying (114) the record information on a display of the mobile communication device. Preferably the mobile communication device will give the user an opportunity to reject (116) the record if it is not the desired record. Upon successfully locating a matching record, the mobile communication device starts a timer (118). The timer is set to expire after a preselected period of time, such as 5 seconds, for example. During the time the timer is not expired, the mobile communication device is initialized to make a call using a first communication mode, such as a dispatch mode. While so initialized, the mobile communication device checks (120) to see if the user has provided an affirmative indication that the first communication mode is the desired mode, such as by pressing a dispatch call button located on the mobile communication device. If so, then a call is immediately made using the first communication mode. However, if no input is received, and the timer expires, then the mobile communication device initializes itself to make a call using a second communication mode, and preferably automatically make a call using a second calling number of the retrieved record. For example, if the timer expires, the mobile communication device will load a telephone number from the retrieved record, and make a telephone call. This obviates the need to for the user to speak two words, such as the name of the party and the type of call desired to be made to the party. While the timer is running, and while no affirmative input is received from the user, it is preferred that the user may also cancel the action.

Figure 2:
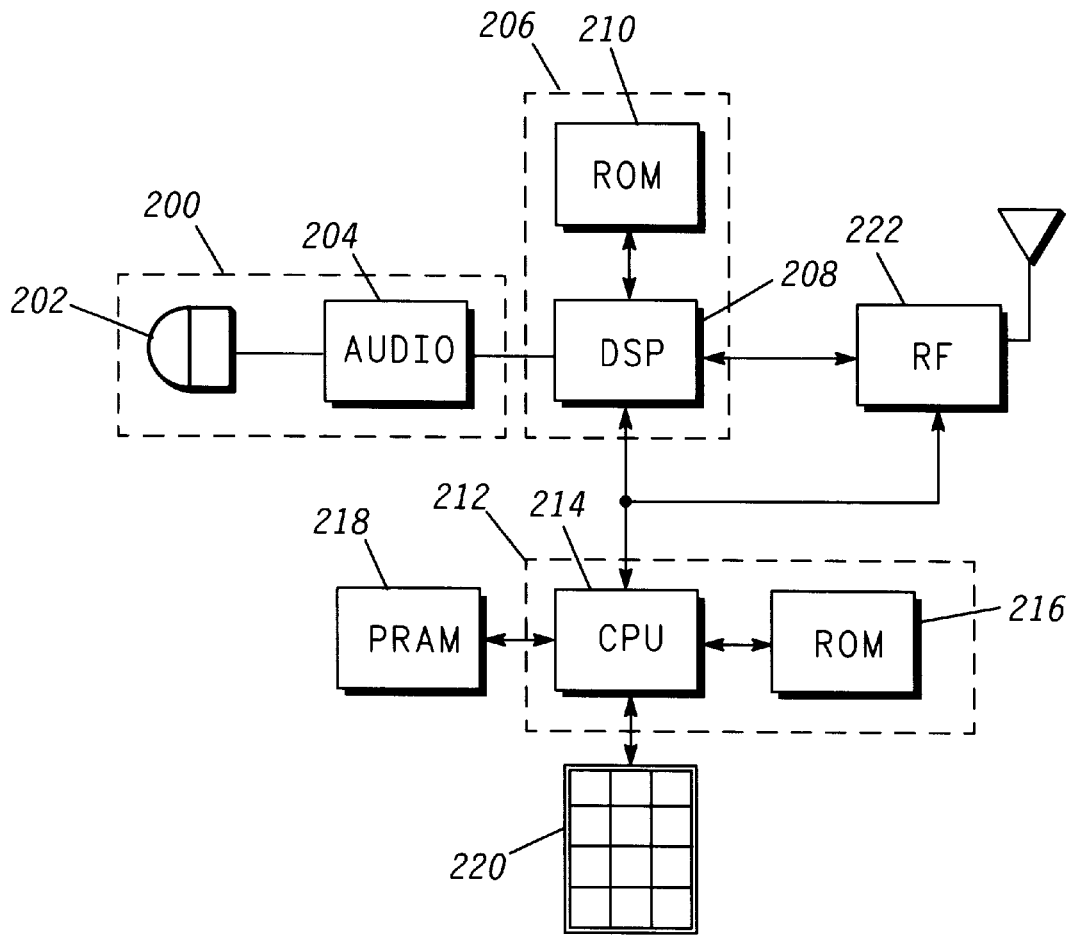
FIG. 2 shows a block diagram schematic of one embodiment of a mobile communication device, in accordance with the invention.

Referring now to FIG. 2, there is shown a block diagram schematic of one embodiment of a mobile communication device, in accordance with the invention. The mobile communication device comprises an audio input processing means 200, including a transducer such as a microphone 202 and preferably audio filtering and amplification circuitry 204. The audio input processing means provides an output signal to a voice recognition means 206, including, for example, a digital signal processor 208 (DSP) and instruction code stored in an associated memory means 210 for performing voice recognition algorithms. Upon processing a received audio voice input signal, the voice recognition means produces an output, as described hereinabove. The voice recognition means may pass this output to controller means 212 for searching, or it is contemplated that the voice recognition means may perform the search itself equivalently. Preferably, the mobile communication device comprises the controller means to control other functions in the mobile communication device, such as input and output, control of the radio frequency hardware, and so on. The controller means includes a microprocessor or microcontroller 214 and instruction code stored in a controller memory 216. The mobile communication device also comprises a semi-permanent memory 218 for storing records. Preferably each record contains an alias field, such as the name of the party, a first communication mode calling number field, and a second communication mode calling number field. The controller means constitutes a monitoring means for monitoring an input device, such as a keypad and other buttons 220. The controller memory contains instructions for performing, among other, steps 108–124 of FIG. 1. Once the type of call to be made is determined, either by the user selecting the first communication mode by asserting an input, or defaulting to the second communication mode, the controller means directs various parts of the mobile communication device to make the desired type of call. This includes controlling a radio frequency means 222 to communicate with a communication system over an air interface, and establish the desired call type.

Thus, the present invention allows for one word voice recognition in a mobile communication device having a plurality of communication modes. The method comprises enabling voice recognition; receiving an audio voice input from the user of the mobile communication device; searching a local memory and correlating the output of the voice recognition process with a record, the record having at least two calling numbers, each associated with a different type of communication mode, then waiting for a preselected period of time. If the user presents an input to the mobile communication device during the preselected time, the mobile communication device makes a call using a first mode of communication. If, however, the preselected period of time expires before any input is received from the user, a call using the second mode of communication is made.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of selecting a communication mode in a mobile communication device having voice recognition capability, the method comprising the steps of:

enabling a voice recognition mode;

receiving an audio voice input;

correlating the audio voice input with a locally stored record, the record having a first calling number for a first communication mode and a second calling number for a second communication mode;

initiating the first communication mode upon receiving an input from a user of the mobile communication device; and if no input is received from the user after a preselected period of time, initiating the second communication mode.

2. A method of selecting a communication mode as defined in claim 1, wherein the step of initiating a first communication mode is initiating a dispatch communication mode.

3. A method of selecting a communication mode as defined in claim 1, wherein the step of initiating a second communication mode is initiating a telephone communication mode.

4. A method of selecting a communication mode as defined in claim 3, wherein the second calling number is a telephone number, the method further comprising the step of automatically dialing telephone number.

5. A mobile communication device, comprising:

a microphone for evaluating an audio voice input;

a voice recognition means for correlating the audio voice input with a locally stored record, the locally stored record stored in a local memory means;

an input means for receiving an input from a user of the mobile communication device; and a monitoring means for monitoring the input means and initiating a first communication mode if the input is received within a preselected period of time, and initiating a second communication mode if no input is received within the preselected period of time.

6. A method of initializing a communication mode of a mobile communication device having voice recognition capability, the mobile communication device comprising a memory containing at least one record, the at least one record having an alias, a first calling number, and a second calling number, the method comprising the steps of:

providing a mobile communication device capable of a first and a second mode of communication;

enabling a voice recognition mode in the mobile communication device;

receiving an audio voice input from a user at the mobile communication device;

correlating the audio voice input with a locally stored record, performed by the mobile communication device, the record having a first calling number for a first communication mode and a second calling number for a second communication mode;

initializing the first communication mode upon receiving an input from a user of the mobile communication device; and if no input is received from the user after a preselected period of time, initiating the second communication mode.

7. A method of initializing a communication mode of a mobile communication device as defined in claim 6, wherein the step of initiating a first communication mode is initiating a dispatch communication mode.

8. A method of initializing a communication mode of a mobile communication device as defined in claim 6, wherein the step of initiating a second communication mode is initiating a telephone communication mode.

9. A method of initializing a communication mode of a mobile communication device as defined in claim 8, wherein the second calling number is a telephone number, the method further comprising the step of automatically dialing telephone number.

* * * * *